United States Patent [19]
Dujardin et al.

[11] Patent Number: 5,177,145
[45] Date of Patent: Jan. 5, 1993

[54] GASOLINE-RESISTANT THERMOPLASTIC MOLDING COMPOUNDS

[75] Inventors: Ralf Dujardin; Jochen Schoeps, both of Krefeld; Martin Wandel, Dormagen, all of Fed. Rep. of Germany

[73] Assignee: Bayer Aktiengesellschaft, Leverkusen, Fed. Rep. of Germany

[21] Appl. No.: 653,841

[22] Filed: Feb. 11, 1991

[30] Foreign Application Priority Data

Feb. 17, 1990 [DE] Fed. Rep. of Germany ....... 4005118

[51] Int. Cl.$^5$ ....................... C08L 69/00; C08L 51/00
[52] U.S. Cl. ........................................ 525/67; 525/69; 525/133; 525/146; 525/147
[58] Field of Search .................. 525/67, 69, 147, 133, 525/146

[56] References Cited

U.S. PATENT DOCUMENTS

| 3,856,886 | 12/1974 | Margotte et al. | 260/873 |
| 4,622,363 | 11/1986 | Eichenauer et al. | 525/67 |
| 4,874,816 | 10/1989 | Dujardin et al. | 525/146 |

FOREIGN PATENT DOCUMENTS 104695  4/1984  European Pat. Off. .

Primary Examiner—David J. Buttner
Attorney, Agent, or Firm—Joseph C. Gil; Aron Preis

[57] ABSTRACT

A thermoplastic molding composition comprising a polycarbonate resin and ABS is rendered improved levels of resistance to gasoline environment and thermal stability upon the incorporation therewith of a particular vinyl copolymer.

2 Claims, No Drawings

GASOLINE-RESISTANT THERMOPLASTIC MOLDING COMPOUNDS

Blends of ABS and polycarbonate are used when the properties of ABS are inadequate. These blends are generally a ternary mixture of polycarbonate, styrene/acrylonitrile copolymer and a graft polymer of styrene and acrylonitrile on polybutadiene.

Blends of ABS and polycarbonate are amorphous and thermoplastic and show high dimensional stability, only a slight tendency towards warping and minimal moisture absorption, high heat resistance (which increases with increasing polycarbonate content) and high resistance to acids and alkalis (H. Domininghaus in "Die Kunststoffe und ihre Eigenschaften", VDI Verlag, 1986, page 253).

By contrast, their resistance to aromatic hydrocarbons and chlorinated hydrocarbons is poor ©n account of their polycarbonate content.

It has now been found that blends of ABS and polycarbonate can be improved in their resistance to gasoline and also in their heat resistance by addition of special vinyl copolymers.

The present invention relates to thermoplastic polymer blends containing

A. 40 to 48 parts by weight and preferably 45 parts by weight of a thermoplastic aromatic polycarbonate, B. 30 to 40 parts by weight and preferably 33 parts by weight of a graft polymer mixture of
  B.1 a graft polymer of 5 to 90 parts by weight and preferably 30 to 80 parts by weight of a mixture of
    B.1.1 50 to 95% by weight styrene, α-methyl styrene, ring-substituted styrene, methyl methacrylate or mixtures thereof and
    B.1.2 5 to 50% by weight acrylonitrile, methacrylonitrile or mixtures thereof on
  B.2 45 to 10 parts by weight and preferably 70 to 20 parts by weight of a particulate rubber having an average particle diameter of 0.09 to 5 μm and preferably 0.1 to 1 μm, C. 10 to 25 parts by weight of a thermoplastic copolymer having a molecular weight Mw (weight average) in the range from 15,000 to 200,000 (as measured by light scattering or sedimentation) of
  C.1 50 to 95% by weight styrene, o-methyl styrene, ring-substituted styrene, methyl methacrylate or mixtures thereof, and
  C.2 50 to 5% by weight (meth)acrylonitrile, methyl methacrylate, maleic anhydride, N-substituted maleic imide or mixtures thereof, and D. 1 to 10 parts by weight and preferably 1 to 5 parts by weight of a graft polymer of polycarbonate chains on a copolymer (graft base) which has been prepared by copolymerizing 95 to 99.5 mol styrene and 5 to 0.5 mol of a compound corresponding to formula (I)

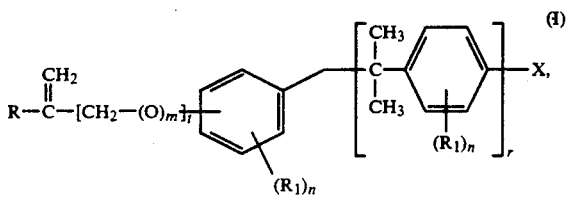

in which
R=H or $C_{1-4}$ alkyl,
$R_1$=Cl, Br, $C_{1-4}$ alkyl, cyclohexyl or $C_{1-4}$ alkoxy,
m=0 or 1,
n=0, 1 or 2,
r=0 or 1,
t=0 or 1 and
X=—O—Si(CH$_3$)$_3$, by radical-initiated bulk polymerization to obtain a copolymer having a molecular weight $\overline{M}_n$ (number average) in the range from 45,000 to 95,000 and subsequently subjecting this copolymer without isolation to reaction with diphenols, phosgene and monophenols in an aqueous-alkaline phase in the presence of an inert organic solvent under phase interface polycondensation conditions so that the percentage content of polycarbonate chains in the graft polymer is from 65% by weight to 45% by weight, the polycarbonate chains have a degree of polycondensation of 35 to 70 and the final viscosity of the organic phase of the reaction mixture is from 5 to 25 mPa.s and preferably from 10 to 20 mPa.s.

The final viscosity is the absolute viscosity of the organic phase of the reaction mixture on completion of polycondensation, as determined with a Hoppler viscosimeter at 20° C.

Mixtures of polycarbonates, polymers and graft polymers with grafted-on polycarbonates are known from U.S. Pat. No. 3,856,886.

These mixtures are said to have good flow properties and good mechanical properties coupled with improved resistance to hot water and alkaline solutions.

EP-PS 0 104 695 describes mixtures of one or more graft polymers, one or more copolymers, one or more polycarbonates and one or more polyurethanes. These mixtures are said to show high resistance to gasoline, favorable processing properties and, in particular, good flow behavior.

DE-OS 3 436 454 reports on the use of special copolymers based on aromatic vinyl compounds, vinyl cyanides and/or esters of (meth)acrylic acid for increasing heat resistance.

By contrast, resistance to gasoline and heat resistance are both improved in the polymer blends according to the invention.

Polycarbonates A suitable for the purposes of the invention are those based on diphenols corresponding to formula (II)

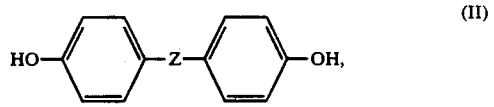

in which Z is a single bond, a $C_{1-8}$ alkylene group, a $C_{2-12}$ alkylidene group, a cyclohexylidene group, a benzylidene group, a methyl benzylidene group, a bis-(phenyl)methylene group, —S—, —SO$_2$—, —CO— or —O—, the phenylene nuclei attached by Z optionally being mono- or di-substituted by methyl, bromine or chlorine, and optionally corresponding to formula (III)

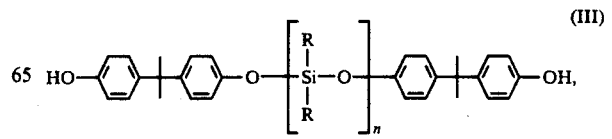

in which

R = $C_{1-6}$ alkyl, preferably $CH_3$—, and n = 20 to 200 and preferably 40 to 80.

Other suitable diphenols of formula (II) are those corresponding to formula (IIa)

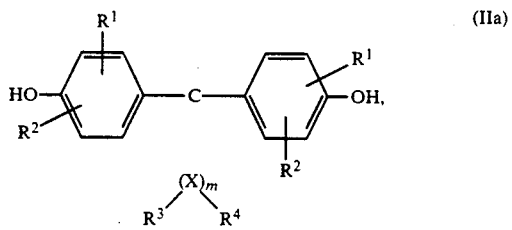
(IIa)

in which $R^1$ and $R^2$ independently of one another represent hydrogen, halogen, preferably chlorine or bromine, $C_1-C_8$ alkyl, $C_5-C_6$ cycloalkyl, $C_6-C_{10}$ aryl, preferably phenyl, and $C_7-C_{12}$ aralkyl, preferably phenyl-$C_1-C_4$-alkyl, more particularly benzyl, m is an integer of from 4 to 7, preferably 4 or 5, $R^3$ and $R^4$ are individually selected for each X and independently of one another represent hydrogen or $C_1-C_6$ alkyl and X represents carbon, with the proviso that, at at least one atom X, both $R^3$ and $R^4$ are alkyl.

Preferably at 1 to 2 atoms X and, more particularly, at only 1 atom X, both $R^3$ and $R^4$ are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Particular preference is attributed to dihydroxydiphenyl cyclohexanes containing 5 and 6 ring C atoms in the cycloaliphatic radical (m = 4 or 5 in formula (IIa), for example diphenols corresponding to the following formulae

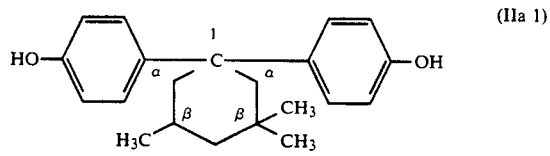
(IIa 1)

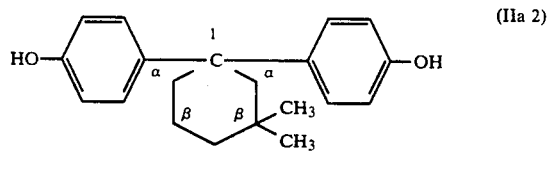
(IIa 2)

and

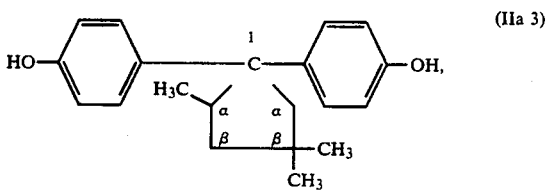
(IIa 3)

the 1,1-bis-(4-hydroxyphenyl)-3,3,5-trimethyl cyclohexane (formula IIa 1)) being particularly preferred.

The diphenols of formula (Ia), their production and their use, optionally in combination with other diphenols, for the production of homopolycarbonates and copolycarbonates are the subject of German patent application P 38 32 396.6.

The production of the polycarbonates A, for example from the diphenols of formula (I), is known or may be carried out by known methods (cf. for example H. Schnell, Chemistry and Physics of Polycarbonates, Interscience Publishers, New York, 1964, or U.S. Pat. Nos. 3,028,365 and 3,275,601).

Examples of diphenols corresponding to formula (II) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)diisopropylbenzenes and ring-alkylated and ring-halogenated compounds thereof.

These and other suitable other diphenols of formula (II) are described, for example, in U.S. Pat. Nos. 3,028,365, 2,999,835, 3,148,172, 3,275,601, 2,991,273, 3,271,367, 3,062,781, 2,970,131 and 2,999,846; in DE-OS 1 570 703, 2 063 050, 2 063 052, 2 211 056, in FR-PS 1 561 518 and in the book by H. Schnell entitled "Chemistry and Physics of Polycarbonates", Interscience Publishers, New York, 1964.

Preferred diphenols of formula (II) are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)propane, 2,2-bis-(3-chloro-4-hydroxyphenyl)-propane, bis(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)propane and also the diphenols Il1), Il2) and Il3).

Particularly preferred diphenols corresponding to formula (II) are, for example, 2,2-bis-(4-hydroxyphenyl)propane, 2,2-bis-(3,5-dimethyl-4-hydroxyphenyl)-propane, 2,2-bis-(3,5-dichloro-4-hydroxyphenyl)-propane, 2,2-bis(3,5-dibromo-4-hydroxyphenyl)-propane, 1,1-bis-(4-hydroxyphenyl)-cyclohexane and the 1,1-bis-(4-hydroxyphenyl)-3,3, 5-trimethylcyclohexane corresponding to formula (IIa 1).

2,2-Bis-(4-hydroxyphenyl)-propane and 1,1-bis-(4-hydroxyphenyl)-3,3,5-trimethylcyclohexane are particularly preferred.

The diphenols of formula (II) may be used both individually and in admixture.

Suitable diphenols corresponding to formula (III) are, for example, those corresponding to formula (IIIa)

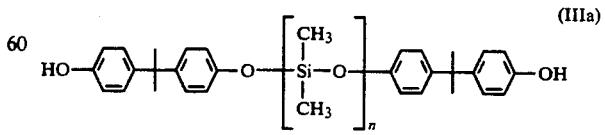
(IIIa)

in which n = 40, 60 or 80.

The polycarbonates A have average molecular weights ($\overline{M}w$, weight average, as measured for example by ultracentrifugation or scattered light measurement)

in the range from 10,000 to 200,000 and preferably in the range from 20,000 to 80,000.

The polycarbonates A may be branched in known manner, preferably by incorporation of 0.05 to 2.0 mol-%, based on the sum of the diphenols used, of trifunctional or more I0 than trifunctional compounds, for example those containing three or more than three phenolic OH groups.

In addition to bisphenol A homopolycarbonate, preferred polycarbonates are the copolycarbonates of bisphenol A with 1,1-bis-(4-hydroxyphenyl)-3,3,5-trimethyl cyclohexane or the copolymers of the diphenols corresponding to formula (II) with 1 to 20% by weight diphenols corresponding to formula (III) and preferably to formula (IIIa), based in either case on the total weight of the diphenols (II) and (III).

Rubbers suitable for the production of the graft polymers B are, in particular, polybutadiene, butadiene/styrene copolymers containing up to 30% by weight, based on rubber, of a lower alkyl ester of acrylic or methacrylic acid (for example methyl methacrylate, ethyl acrylate, methyl acrylate or ethyl methacrylate). Other suitable rubbers are, for example, polyisoprene, polychloroprene, alkyl acrylate rubbers based on $C_{1-8}$ alkyl acrylates, more particularly ethyl, butyl, ethyl hexyl acrylate. The alkyl acrylate rubbers may optionally contain up to 30% by weight, based on rubber, of vinyl acetate, acrylonitrile, styrene, methyl methacrylate and/or vinyl ether in copolymerized form. The alkyl acrylate rubbers may contain relatively small quantities, preferably up to 5% by weight, based on rubber, of copolymerized crosslinking monomers, for example alkylenediol di(meth)acrylates, polyester di(meth)acrylate, divinylbenzene, trivinylbenzene, triallyl cyanurate, allyl (meth)acrylate, butadiene or isoprene. Other suitable acrylate rubbers are products having a core/shell structure which contain a crosslinked diene rubber, such as polybutadiene or SBR, as core. EPDM rubbers, rubbers of ethylene, propylene and an unconjugated diene, are also suitable.

Diene and alkyl acrylate rubbers are preferred.

The rubbers are present in the graft polymers B. in the form of at least partly crosslinked particles having an average particle diameter of 0.09 to 5 μm and more especially 0.1 to 1 μm. The graft polymers B are prepared by radical graft copolymerization of the monomer mixture B.1.1 and B.1.2 in the presence of the rubbers B.2.

Preferred processes for the production of the graft polymers are emulsion, solution, bulk or suspension polymerization. Particularly preferred graft polymers B are ABS polymers.

Preferred copolymers C are obtained from C.1 styrene, α-methyl styrene, ring-substituted styrene on the one hand and C.2 acrylonitrile, methacrylonitrile, methyl methacrylate, maleic anhydride, N-substituted maleic imide on the other hand. Halostyrenes and p-methyl styrene are mentioned as ring-substituted styrenes.

Copolymers C are frequently formed as secondary products in the production of the graft polymers B, particularly when large quantities of monomers are grafted onto small quantities of rubber.

The quantity of copolymers C to be used in accordance with the invention of 10 to 25 parts by weight, based on 100 parts by weight of A+B+C+D, does not include these secondary products of the graft polymerization.

The copolymers C are resin-like, thermoplastic and rubber free. Particularly preferred copolymers C are those of styrene with acrylonitrile and optionally with methyl methacrylate, of o-methyl styrene with acrylonitrile and optionally with methyl methacrylate or of styrene and α-methyl styrene with acrylonitrile and optionally with methyl methacrylate.

Particularly preferred ratios by weight in the thermoplastic copolymer C are 60 to 80% by weight C.1 and 40 to 20% by weight C.2.

The copolymers C are known and may be produced by radical polymerization, more particularly by emulsion, suspension, solution or bulk polymerization. The copolymers C have molecular weights $\overline{M}w$ (weight average, as determined by light scattering or sedimentation) in the range from 15,000 to 200,000.

The graft copolymers D and their production are described in DE-OS 3 717 172 to which reference is made here.

The thermoplastic polymer blends according to the invention may be produced by mixing components A, B, C, D and optionally stabilizers, pigments, flow aids, mold release agents, flameproofing agents and/or antistatic agents and melt-compounding or melt-extruding the resulting mixture in standard units at temperatures in the range from 200° to 330° C.

The constituents may be premixed both successively and simultaneously in known manner at around 20° C. (room temperature) or at a higher temperature.

The polymer alloys according to the invention may be used for the production of moldings of all kinds.

More particularly, moldings may be produced by injection molding. Examples of moldings are housing parts of all kinds (for example for domestic appliances, such as juice presses, coffee machines, mixers) or cover panels for the building industry and, preferably, automobile parts which come into contact with gasoline or other plastics.

In addition, the polymer blends according to the invention are used in the electrical engineering field by virtue of their very good electrical properties.

Another form of processing is the production of moldings by thermoforming from prefabricated sheets or films.

Particle diameter always means the average particle diameter $d_{50}$, as determined by ultracentrifuge measurements in accordance with W. Scholtan et al., Kolloid-Z.u.Z. Polymere, 250 (1972), 782–796).

EXAMPLES

Components used

Polycarbonate A

Linear polycarbonate based on bisphenol A having a solution viscosity of 1.28, as measured in $CH_2Cl_2$ at 25° C. and in a concentration of 0.5 g/100 ml.

Graft polymer B

SAN graft polymer of 50% of a mixture acrylonitrile (ratio by weight 72:28) on 50% particulate polybutadiene having an average particle size ($d_{50}$) of 0.4 μm, obtained by emulsion polymerization.

Copolymer C

Styrene/acrylonitrile copolymer having a ratio of styrene to acrylonitrile of 70:30 and an intrinsic viscosity [η] of 0.75 dl/g (as measured in dimethyl formamide at 20° C.).

Production of the graft copolymers D

EXAMPLE 1

(a) Graft Base obtained by bulk copolymerization of 1,950 g styrene and 50 g 4-trimethylsiloxy-α-methyl styrene in the presence of 2 g α,α'-azodiisobutyronitrile under nitrogen over a period of 29 hours at 80° C. The average molecular weight $\overline{M}_n$, as determined by gel permeation chromatography, was 68,377 g/mol.

(b) Grafting reaction 1 1 kg (11.1 mol) phosgene is introduced with stirring over a period of 1 hour at 20° to 25° C. into a mixture of 2.223 kg (9.75 mol) 2,2-bis-(4-hydroxyphenyl)propane (BPA); 43.9 g ($\triangleq$ 3 mol-%, based on BPA) p-tert.-butylphenol; 2.3 kg 45% sodium hydroxide; 40 l water, 20 kg chlorobenzene and 1.95 kg of the graft base described in a) dissolved in 20 kg methylene chloride. 19 ml ($\triangleq$ 1 mol-%, based on BPA) N-ethyl piperidine are then added, followed by stirring for 1 hour. The organic phase is separated off, washed free until free from electrolyte and extruded at 300° C. until the methylene chloride distills off. 3.9 kg product having a relative solution viscosity $\eta_{rel}$ of 1.482 were obtained. The calculated molecular weight $\overline{M}_n$ of the polycarbonate side branches/grafting site is 13,293 g/mol, corresponding to a degree of polycondensation $\overline{p}$ of 52.

To determine resistance to gasoline, test specimens measuring 80 mm × 10 mm × 4 mm were made and fixed to flexible templates having different radii of curvature so that outer fiber strains $\epsilon_R$ of 0% and 1.0% were obtained. The templates with the test specimens were then stored for 15 minutes at 70° C. in a heating cabinet (with air turbulence in accordance with DIN 50 011, 2, 3).

The templates with the test specimens were removed from the heating cabinet and a cotton wool plug impregnated with a test fuel was applied immediately thereafter. The test fuel was a test gasoline corresponding to DIN 51 604 which consists of 50% by volume toluene, 30% by volume isooctane, 15% by volume diisobutylene and 5% by volume ethanol. After a contact time of 15 minutes, the cotton wool plug was removed and the test specimen left for another 15 minutes to air.

The test specimens were then evaluated as follows with the naked eye:

| Stage | Feature |
|---|---|
| 1 | No visible change |
| 2 | Surface matted |
| 3 | Fine cracks |
| 4 | Large cracks, failure |

The improved impact strength was also determined on test specimens measuring 80 mm × 10 mm × 4 mm. Izod notched impact strength ($a_k$) was determined in accordance with ISO 180/1A.

Heat resistance was determined by the Vicat (B) method in accordance with DIN 53 460/ISO 360.

| Examples | | Comparison | 1 |
|---|---|---|---|
| Polycarbonate A | parts by weight | 45 | 42 |
| Polycarbonate B | parts by weight | 33 | 33 |
| Copolymer C | parts by weight | 22 | 20 |
| Graft copolymer D | parts by weight | — | 5 |
| Notched impact strength (room temperature) | kJ/m² | 45.8 | 69.3 |
| Heat resistance (softening temperature) | Vicat A | 110 | 116 |
| Gasoline resistance | $\epsilon_R = 0.4\%$ | 4 | 2 |
| | $\epsilon_R = 1.0\%$ | — | 3 |

What is claimed is:

1. A thermoplastic molding composition comprising a blend of

A) 40 to 48 parts by weight of a thermoplastic aromatic polycarbonate resin,

B) 30 to 40 parts by weight of a graft polymer containing

B.1) 5 to 90 parts by weight of a mixture of

B.1.1) 50 to 95% by weight of at least one member selected from the group consisting of styrene, α-methyl styrene, ring-substituted styrene and methyl methacrylate, and B.1.2) 5 to 50% by weight of at least one member selected form the group consisting of acrylonitrile and methacrylonitrile, grafted on 'B.2) 95 to 10 parts by weight of a particulate rubber having an average particle diameter of 0.09 to 5 μm, C) 10 to 25 parts by weight of a thermoplastic copolymer having a weight average molecular weight in the range of 15,000 to 200,000 (as measured by light scattering or sedimentation) of (i) or (ii), where (i) is from 50 to 95% by weight of at least one member selected from the group consisting of styrene, α-methylstyrene, ring substituted styrene and methyl methacrylate and from 50 to 5% by weight of at least one member selected from the group consisting of (meth)acrylonitrile, maleic anhydride and N-substituted maleic imide and (ii) is form 50 to 95% by weight of at least one member selected from the group consisting of styrene, α-methylstyrene, ring substituted styrene, and from 50 to 5% by weight of (meth)acrylonitrile, methylmethacrylate, maleic anhydride and N-substituted maleic imide and D) 1 to 10 parts by weight of a graft polymer of polycarbonate chains on a copolymer graft base which has been prepared by copolymerizing 95 to 99.5 mol styrene and 5 to 0.5 mol of a compound corresponding to formula (I)

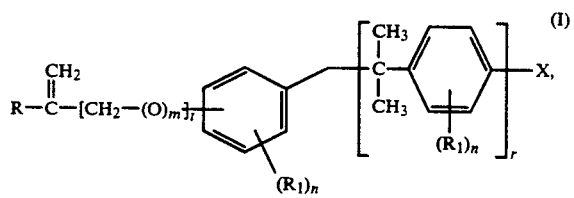

in which
R=H or $C_{1-4}$ alkyl,
$R_1$=Cl, Br, $C_{1-4}$ alkyl, cyclohexyl or $C_{1-4}$ alkoxy,
m=0 to 1,
n=0, 1 or 2,
r=0 or 1, t=0 or 1 and
X=—O—Si(CH$_3$)$_3$,
by radical-initiated bulk polymerization to a number average molecular weight in the range of 45,000 to 95,000 and subsequently subjecting this copolymer graft base without isolation to reaction with diphenols, phosgene and monophenols in an aqueous-alkaline phase in the presence of an inert organic solvent under the conditions of a two-phase interfacial polycondensation process to obtain a graft polymer having a content of polycarbonate chains of 65 to 45 percent by weight, said polycarbonate chains having a degree of polycondensation of 35 to 70 said process being characterized in that the final viscosity of the organic phase of the reaction mixture is from 5 to 25 mPa.s.

2. The composition of claim 1 wherein said rubber is selected from the group consisting of diene and acrylate rubbers.

* * * * *